United States Patent [19]
Akatsu et al.

[11] 3,910,889
[45] *Oct. 7, 1975

[54] NOVEL BENZODIAZEPINE DERIVATIVES AND PREPARATION THEREOF

[75] Inventors: Mitsuhiro Akatsu, Ikeda; Yoshiharu Kume, Takarazuka; Toshiyuki Hirohashi, Ashiya; Kikuo Ishizumi, Ikeda; Michihiro Yamamoto, Toyonaka; Isamu Maruyama, Minoo; Kazuo Mori, Kobe; Takahiro Izumi; Shigeho Inaba, both of Takarazuka; Hisao Yamamoto, Nishinomiya, all of Japan

[73] Assignee: Sumitomo Chemical Company, Limited, Osaka, Japan

[ * ] Notice: The portion of the term of this patent subsequent to Dec. 11, 1990, has been disclaimed.

[22] Filed: Aug. 20, 1971

[21] Appl. No.: 173,701

[30] Foreign Application Priority Data
Aug. 31, 1970 Japan.............................. 45-76544
Aug. 31, 1970 Japan.............................. 45-76545
Sept. 2, 1970 Japan.............................. 45-77323

[52] U.S. Cl.... 260/239.3 D; 260/306.7; 260/307 B; 260/326.15; 260/345.9; 260/347.8; 424/244; 424/263; 424/283; 424/285
[51] Int. Cl.$^2$.............. C07D 243/30; C07D 243/36; C07D 243/24
[58] Field of Search.......................... 260/239.3 D

[56] References Cited
UNITED STATES PATENTS

| | | | |
|---|---|---|---|
| 3,391,138 | 7/1968 | Archer et al............. | 260/239.3 D |
| 3,391,938 | 7/1968 | Archer et al............. | 260/239.3 D |
| 3,558,603 | 1/1971 | Yamamoto et al......... | 260/239.3 D |
| 3,784,542 | 1/1974 | Hellerbach et al........ | 260/239.3 D |

FOREIGN PATENTS OR APPLICATIONS
1,923,139  11/1969  Germany.................... 260/239.3 D

OTHER PUBLICATIONS
Chemical Abstracts, Vol. 73, (1970), Item 45481f, abstracting Lamadan et al., in "J. Med. Chem.," Vol. 13, No. 4, pp. 742–744, (1970).

Primary Examiner—Henry R. Jiles
Assistant Examiner—Robert T. Bond
Attorney, Agent, or Firm—Farrell R. Werbow

[57] ABSTRACT

A novel benzodiazepine derivatives represented by the formula,

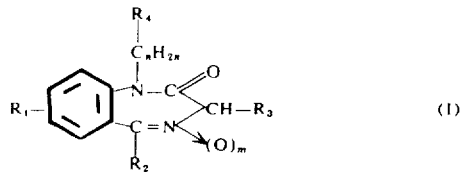

and acid addition salts thereof, wherein $R_1$ represents hydrogen, halogen, nitro, $C_{1-4}$ alkoxy, cyano or trifluoromethyl; $R_2$ represents a group of the formula,

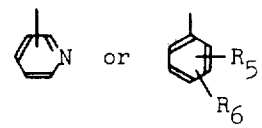

wherein $R_5$ and $R_6$ represent hydrogen, halogen, $C_{1-4}$ alkyl or trifluoromethyl;
$R_3$ represents hydrogen, $C_{1-4}$ alkyl or aralkyl;
$R_4$ represents tetrahydropyranyloxy, tetrahydrofuranyloxy, aryloxy, aralkoxy or alkoxyalkoxy;
$n$ represents an integer of 1 to 4;
and $m$ represents zero or 1, which is prepared by
a. reacting a 1-unsubstituted benzodiazepine derivative of the formula,

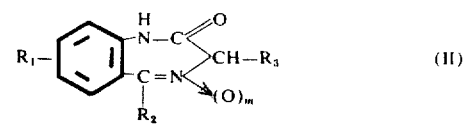

with a reactive ester of a compound of the formula,

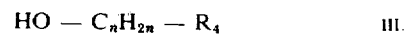

wherein $R_1$, $R_2$, $R_3$, $R_4$, $m$ and $n$ are as defined above, or (b) treating a 2-aminomethylindole derivative represented by the formula,

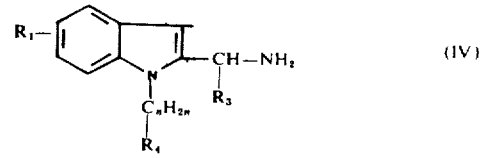

wherein $R_1$, $R_2$, $R_3$, $R_4$ and $n$ are as defined above, with an oxidizing agent, or
c. treating a benzophenone derivative of the formula,

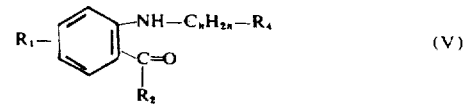

wherein $R_1$, $R_2$, $R_4$ and $n$ are as defined above, with a 2,5-dione derivative of the formula,

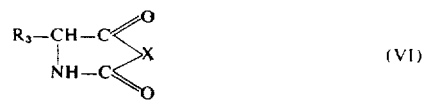

wherein $R_3$ is the same as defined above, and X represents oxygen or sulfur.

The benzodiazepine derivatives of the formula (I) or salts thereof have valuable pharmacological properties in particular excellent tranquillizing, sedative, muscle relaxant, hexobarbital potentiating activities.

10 Claims, No Drawings

NOVEL BENZODIAZEPINE DERIVATIVES AND PREPARATION THEREOF

This invention relates to novel benzodiazepine derivatives, process for preparing thereof and pharmaceutical composition containing the same. More particularly, this invention pertains to the production of novel benzodiazepine derivatives represented by the formula,

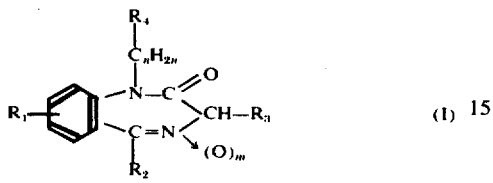

wherein $R_1$ represents hydrogen, halogen, nitro, $C_{1-4}$ alkoxy, cyano or trifluoromethyl; $R_2$ represents a group of the formula,

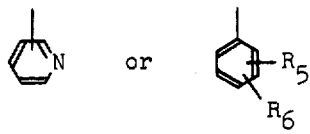

wherein $R_5$ and $R_6$ represent hydrogen, halogen, $C_{1-4}$ alkyl or trifluoromethyl;

$R_3$ represents hydrogen, $C_{1-4}$ alkyl or aralkyl;

$R_4$ represents tetrahydropyranyloxy, tetrahydrofuranyloxy, aryloxy, aralkoxy or alkoxyalkoxy;

$m$ represents zero or 1;

and $n$ represents an integer of 1 to 4.

In the compounds represented by the formula (I), examples of the halogen atom include chlorine, bromine, iodine and fluorine atoms; examples of $C_{1-4}$ alkoxy group include methoxy, ethoxy, n-propoxy, isopropoxy, n-butoxy, isobutoxy and tertiary butoxy groups; and examples of $C_{1-4}$ alkyl group include methyl, ethyl, n-propyl, isopropyl, butyl, isobutyl and tertiary butyl groups. Examples of the aryloxy group include unsubstituted phenoxy, halogen-substituted phenoxy and $C_{1-4}$ alkyl-substituted phenoxy groups; examples of the aralkoxy group include unsubstituted benzyloxy, halogen- or $C_{1-4}$ alkyl-substituted benzyloxy, unsubstituted phenethyloxy, and halogen- or $C_{1-4}$ alkyl-substituted phenethyloxy groups; examples of the alkoxyalkoxy group include methoxymethoxy, methoxyethoxy, methoxypropoxy, ethoxymethoxy, ethoxyethoxy, and ethoxypropoxy groups. The $-C_nH_{2n}-$ group represents a straight chain or branched chain alkylene group having 1 to 4 carbon atoms, and includes, for example, methylene, ethylene, 1-methylethylene, 2-methylethylene, trimethylene, 1-methyltrimethylene and 2-methyltrimethylene groups.

It has surprisingly been found by the present inventors that the compounds represented by the formula (I) and their pharmaceutically acceptable salts with inorganic and organic acids, have valuable pharmocological properties, in particular excellent tranquillizing, sedative, muscle relaxant, anticonvulsant and hexobarbital potentiating activities.

An object of the present invention is to provide such novel and useful benzodiazepines and salts thereof.

Another object of the present invention is to provide a novel and advantageous process for producing benzodiazepines and salts thereof.

A further object of the invention is to provide a pharmaceutical use of such benzodiazepine derivatives. Other objects and merits of the present invention will be apparent from the following descriptions.

According to the present invention, the novel benzodiazepines represented by the formula (I) may be prepared by a variety of methods.

One method, for producing the benzodiazepines of the formula (I) comprises reacting 1-unsubstituted benzodiazepines represented by the formula,

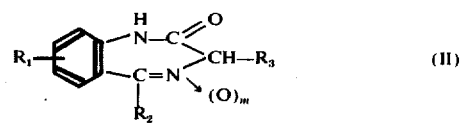

wherein $R_1$, $R_2$, $R_3$ and $m$ are as defined above, with a reactive ester of a compound represented by the formula,

$$HO - C_nH_{2n} - R_4$$

III wherein $R_4$ and $n$ are as defined above. Examples of reactive esters include hydrohalic acid esters such as the chlorides, bromides and iodides and sulfonic acid esters such as methanesulfonate, p-toluenesulfonate, β-naphthalenesulfonate and trichloromethanesulfonate. The reaction may be carried out by reacting a compound of the formula (II) with a reactive ester of the compound of the formula (III) in the presence of an alkaline agent or by contacting the compound of the formula (II) with an alkaline agent to form the metal salt and then contacting the resulting metal salt with a reactive ester of the compound of the formula (III). Examples of the alkaline agents include alkali metal hydride such as sodium hydride or lithium hydride, alkali metal hydroxide such as potassium hydroxide, alkali metal amide such as sodium amide, potassium amide or lithium amide, alkylalkali such as butyl lithium, phenylalkali such as phenyl lithium, alkali metal alcoholate such as sodium methylate, sodium ethylate, potassium tertiary-butoxide or the like. The reaction may generally be effected in an organic solvent or solvent mixture. Suitable solvents include benzene, toluene, xylene, dimethylformamide, dimethylacetamide, diphenyl ether, diglyme, dimethyl sulfoxide, methyl ethyl ketone, N-methyl pyrrolidone and the like, and a solvent mixture thereof. The reaction may be carried out at a temperature within the range between about room temperature and the boiling point of the solvent employed.

Another method for producing benzodiazepine derivative of the formula (I) comprises by treating 2-aminomethyl indole derivatives represented by the formula,

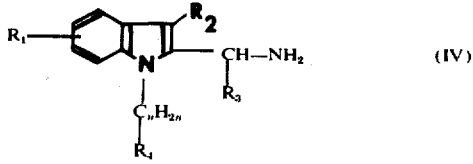

wherein $R_1$, $R_2$, $R_3$, $R_4$ and $n$ are as defined above, or acid addition salts thereof, with an oxidizing agent. Examples of the acid addition salt include hydrochloride, hydrobromide, sulfate or phosphate. The oxidizing agent for this process includes, for example, ozone, hydrogen peroxide, peracid (e.g. performic, peracetic, m-chloroperbenzoic and perbenzoic acids), chromic acid and potassium permanganate, but is not limited to the named compounds. Generally, the reaction proceeds readily at room temperature, but the temperature may be higher or lower, for example, $-20°$ to about $+100°C$ or a boiling point of the solvents, preferably $-10°$ to $+60°C$, as necessary to effect the desired control of the reaction, and the reaction temperature varies depending on the oxidizing agent employed. The preferable oxidizing agent is chromic acid or ozone. The reaction is preferably effected in the presence of a solvent. The choice of the solvent depends on the oxidizing agent employed, and is selected from the group consisting of water, acetone, carbon tetrachloride, formic acid, acetic acid, sulfuric acid and the like. The oxidizing agent is used in the stoichiometric amount or more.

Where the oxidation is carried out by use of chromic acid in the presence of acetic acid, it is preferable that the chromic acid may be used in 2–3 times the equimolar amount and the reaction is preferably carried out at room temperature. A 2-aminomethylindole derivative is dissolved or suspended in the solvent and the oxidizing agent is added to the solution or suspension with stirring.

Where the oxidation is carried out by use of ozone, the reaction is preferably carried out at room temperature or below. A 2-aminomethylindole derivative is dissolved or suspended in the solvent such as formic acid, acetic acid, carbon tetrachloride or the like and ozonized oxygen is bubbled into the solution or suspension with stirring.

Other method for producing benzodiazepine derivatives represented by the aforesaid formula (I) which comprises treating a benzophenone derivative represented by the formula,

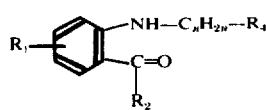

(V)

wherein $R_1$, $R_2$, $R_4$ and $n$ are the same as defined above with a 2,5-dione derivative represented by the formula

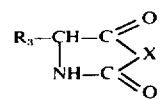

(VI)

wherein $R_3$ is the same as defined above, and X represents oxygen or sulfur.

The reaction is preferably effected in the presence of a solvent or solvent mixture. Suitable solvent include, for example, chloroform, carbon tetrachloride, methylene chloride, ethylene chloride, ether, diisopropyl ether, tetrahydrofuran, dioxane, water, methanol, ethanol, dimethylformamide, dimethyl sulfoxide or a mixture thereof. The reaction is, generally, carried out in the presence of an acid. The acid used in this process includes hydrogen chloride, hydrogen bromide, sulfuric acid, phosphoric acid, polyphosphoric acids, borontrifluoride and paratoluenesulfonic acid. The reaction is effected at a temperature ranging from $-25°C$ to about $120°C$, and more preferably from about $0°C$ to about $30°C$. Temperatures above and below the aforesaid ranges can also be employed but are less preferred. In most instances, the reaction can be conducted at room temperature or below. Pressure is not necessarily critical and the process can be conducted at atmospheric, subatmospheric or superatmospheric pressure. The process, if desired, can be conducted in an inert atmosphere, such as nitrogen, argon and the like.

Although the mole ratio of the 2,5-dione derivative to the benzophenone derivative is not critical, it is preferable to use at least stoichiometric amount of the reactant. In most cases, it is more preferable to use an excess of the 2,5-dione derivative.

The desired benzodiazepine derivative can be separated from the reaction mixture in a crude form by extraction, with or without prior neutralization, and by evaporation to dryness. The product is further purified, if desired, by recrystallization from a suitable solvent such as ethanol, isopropanol, isopropylether or their mixture or the like in a standard procedure.

The benzodiazepine derivative obtained according to the above-mentioned processes may also be isolated in the form of an acid addition salt by treatment with an acid, e.g. a mineral acid such as hydrochloric, hydrobromic, sulfuric, nitric, or phosphoric acid or an organic acid such as maleic, fumaric, succinic, formic or acetic acid.

Benzodiazepines or salts thereof of the present invention can be administered parenterally or orally in therapeutic dosage forms with dosage adjusted to individual needs, that is, in solid or liquid dosage forms such as tablets, dragees, capsules, suspensions, solutions, elixirs and the like.

This invention is further illustrated by the following examples of preferred embodiments thereof, which are presented for the purpose of illustration and are not intended to limit the scope of the present invention.

EXAMPLE 1

A solution of 5 g of 5-phenyl-7-chloro-1,3-dihydro-2H-1,4-benzodiazepin-2-one in 40 ml of N,N-dimethylformamide is added to a suspension of 1.3 g of sodium methoxide in 40 ml of N,N-dimethylformamide, and the mixture is heated at 50°–60°C for 1 hour. After the mixture is cooled, 4.36 g of 2-phenoxyethyl chloride in 20 ml of dry toluene is added thereto below 10°C and then the mixture is stirred at 80°–85°C for 5 hours. The reaction mixture is poured into water, and extracted with chloroform. The chloroform extracts are combined, washed with saturated sodium chloride solution, dried over anhydrous sodium sulfate, and concentrated to dryness. The residue is crystallized, and recrystallized from isopropanol-chloroform to give colorless prisms of 1-(β-phenoxyethyl)-5-phenyl-7-chloro-1,3-dihydro-2H-1,4-benzodiazepin-2-one, m.p. 165°–166°C.

EXAMPLE 2

Using the procedure similar to that described in Example 1, but replacing 5-phenyl-7-chloro-1,3-dihydro-2H-1,4-benzodiazepin-2-one by 5-(o-fluorophenyl)-7- chloro-1,3-dihydro-2H-1,4-benzodiazepin-2-one, there is obtained 1-(β-phenoxyethyl)-5-(o-fluorophenyl)-7-chloro-1,3-dihydro-2H-1,4-benzodiazepin-2-one, m.p. 131°–132°C.

EXAMPLE 3

Using the procedure similar to that described in Example 1, but replacing 2-phenoxyethyl chloride by 2-benzyloxyethyl chloride, there is obtained 1-(β-benzyloxyethyl)-5-phenyl-7-chloro-1,3-dihydro-2H-1,4-benzodiazepin-2-one, m.p. 133°–135°C.

Similarly, the following compound is obtained: 1-(β-benzyloxyethyl)-5-(o-fluorophenyl)-7-chloro-1,3-dihydro-2H-1,4-benzodiazepin-2-one, m.p. 114°–115.5°C.

EXAMPLE 4

A solution of 5 g of 5-phenyl-7-chloro-1,3-dihydro-2H-1,4-benzodiazepin-2-one in 40 ml of N,N-dimethylformamide is added to a suspension of 1.3 g of sodium methoxide in 40 ml of N,N-dimethylformamide, and the mixture is heated at 50°–60°C for 1 hour. After the mixture is cooled, 4.58 g of 2-(2′-tetrahydropyranyloxy)-ethyl chloride in 20 ml of dry toluene is added thereto below 10°C and then the mixture is stirred at 110°–115°C for 4 hours. The reaction mixture is poured into ice-water, and extracted with chloroform. The chloroform extracts are combined, washed with saturated sodium chloride solution, dried over anhydrous sodium sulfate, and the solvent is removed under reduced pressure. The residue is dissolved in chloroform, chromatographed on silica gel and eluted with ethylacetate-chloroform (1:1) to give a syrup which is crystallized. Recrystallization from isopropanol-isopropyl ether gives 1-[β-(α′-tetrahydropyranyloxy)-ethyl]-5-phenyl-7-chloro-1,3-dihydro-2H-1,4-benzodiazepin-2-one as colorless prisms, m.p. 126°–127°C.

EXAMPLE 5

Using the procedure similar to that described in Example 4, but replacing 5-phenyl-7-chloro-1,3-dihydro-2H-1,4-benzodiazepin-2-one by 5-(o-fluorophenyl)-7-chloro-1,3-dihydro-2H-1,4-benzodiazepin-2-one, there is obtained 1-[β-(α′-tetrahydropyranyloxy)-ethyl]-5-(o-fluorophenyl)-7-chloro-1,3-dihydro-2H-1,4-benzodiazepin-2-one, m.p. 102°–104°C.

EXAMPLE 6

A solution of 5 g of 5-phenyl-7-chloro-1,3-dihydro-2H-1,4-benzodiazepin-2-one in 40 ml of N,N-dimethylformamide is added to a suspension of 1.3 g of sodium methoxide in 40 ml of N,N-dimethylformamide, and the mixture is heated at 50°–60°C for 1 hour. After the mixture is cooled, 3.85 g of 2-(2′-methoxyethoxy)-ethyl chloride in 20 ml of dry toluene is added thereto below 10°C and then the mixture is stirred at 100°–105°C for 3 hours. The reaction mixture is poured into ice-water, and extracted with chloroform. The chloroform extracts are combined, washed with saturated sodium chloride solution, dried over anhydrous sodium sulfate, and the solvent is removed under reduced pressure. The residue is dissolved in benzene, chromatographed on neutral alumina, and eluted with benzene to give 1-[β-(β′-methoxyethoxy)-ethyl]-5-phenyl-7-chloro-1,3-dihydro-2H-1,4-benzodiazepin-2-one as a solid. Recrystallization from isopropanol isopropyl ether gives colorless prisms, m.p. 93°–94°C.

EXAMPLE 7

Using the procedure similar to that described in Example 6, but replacing 5-phenyl-7-chloro-1,3-dihydro-2H-1,4-benzodiazepin-2-one by 5-(o-fluorophenyl)-7-chloro-1,3-dihydro-2H-1,4-benzodiazepin-2-one, there is obtained 1-[β-(β′-methoxyethoxy)-ethyl]-5-(o-fluorophenyl)-7-chloro-1,3-dihydro-2H-1,4-benzodiazepin-2-one, m.p. 70°–72°C.

Similarly, the following compounds are obtained: 1-[β-(β′-ethoxyethoxy)-ethyl]-5-phenyl-7-chloro-1,3-dihydro-2H-1,4-benzodiazepin-2-one, m.p. 78°–79°C. 1-[β-(β′-ethoxyethoxy)-ethyl]-5-(o-fluorophenyl)-7-chloro-1,3-dihydro-2H-1,4-benzodiazepin-2-one, m.p. 76°–77°C. 1-(β-phenoxyethyl)-5-phenyl-7-chloro-1,3-dihydro-2H-1,4-benzodiazepin-2-one 4-oxide, m.p. 238°–239.5°C. 1-(β-benzyloxyethyl)-5-phenyl-7-chloro-1,3-dihydro-2H-1,4-benzodiazepin-2-one 4-oxide, m.p. 155°–156°C. 1-[β-(β′-methoxyethoxy)-ethyl]-5-phenyl-7-chloro-1,3-dihydro-2H-1,4-benzodiazepin-2-one 4-oxide, m.p. 132°–133°C. 1-(β-benzyloxyethyl)-5-(o-fluorophenyl)-7-chloro-1,3-dihydro-2H-1,4-benzodiazepin-2-one 4-oxide, m.p. 123°–124°C. 1-[β-(α′-tetrahydropyranyloxy)-ethyl]-5-(o-fluorophenyl)-7-chloro-1,3-dihydro-2H-1,4-benzodiazepin-2-one 4-oxide, m.p. 145°–146°C.

EXAMPLE 8

A solution of 1 g of chromic anhydride in 1 ml of water is added to a solution of 1 g of 1-(β-phenoxyethyl)-2-aminomethyl-3-phenyl-5-chloroindole in 20 ml of acetic acid at room temperature. The mixture is stirred at room temperature overnight. The reaction mixture is poured into ice-water, neutralized with aqueous ammonia, and extracted with methylene chloride. The methylene chloride extracts are combined, washed with saturated sodium chloride solution, dried over anhydrous sodium sulfate, and the solvent is removed. The residue is crystallized and recrystallized from isopropanol-chloroform to give 1-(β-phenoxyethyl)-5-phenyl-7-chloro-1,3-dihydro-2H-1,4-benzodiazepin-2-one, m.p. 165°–166°C.

EXAMPLE 9

Ozonized oxygen is bubbled into a stirred solution of 1 g of 1-[β-(β′-methoxyethoxy)-ethyl]-2-aminomethyl-3-phenyl-5-chloroindole in 20 ml of acetic acid at 20°–25°C for 2 hours. The reaction mixture is poured into ice-water, neutralized with aqueous ammonia, and extracted with chloroform. The extracts are combined, washed with saturated sodium chloride solution, dried over anhydrous sodium sulfate, and the solvent is removed. The residue is dissolved in benzene, chromatographed on neutral alumina and eluted with benzene to give a solid. Recrystallization from isopropanol-isopropyl ether gives 1-[β-(β′-methoxyethoxy)-ethyl]-5-phenyl-7-chloro-1,3-dihydro-2H-1,4-benzodiazepin-2-one, m.p. 93°–94°C.

EXAMPLE 10

Ozonized oxygen is bubbled into a stirred solution of 1 g of 1-[β-(α′-tetrahydropyranyloxy)-ethyl]-2-aminomethyl-3-phenyl-5-chloroindole in 50 ml of carbon tetrachloride at −5° to 0°C for 1 hour. The reaction mixture is poured into water, and then extracted with methylene chloride. The extracts are combined, dried over anhydrous sodium sulfate and concentrated to dryness. The residue is crystallized and recrystallized from isopropanol-isopropyl ether to give 1-[β-(α'-tetrahydropyranyloxy)-ethyl]-5-phenyl-7-chloro-1,3-dihydro-2H-1,4-benzodiazepin-2-one, m.p. 126°–127°C.

Similarly, using the procedures described in Examples 8–10, there are obtained the following benzodiazepine derivatives. 1-(β-phenoxyethyl)-5-(o-fluorophenyl)-7-chloro-1,3-dihydro-2H-1,4-benzodiazepin-2-one, m.p. 131°–132°C. 1-(β-benzyloxyethyl)-5-phenyl-7-chloro-1,3-dihydro-2H-1,4-benzodiazepin-2-one, m.p. 133°–135°C. 1-(β-benzyloxyethyl)-5-(o-fluorophenyl)-7-chloro-1,3-dihydro-2H-1,4-benzodiazepin-2-one, m.p. 114°–115.5°C. 1-[β-(α'-tetrahydropyranyloxy)-ethyl]-5-(o-fluorophenyl)-7-chloro-1,3-dihydro-2H-1,4-benzodiazepin-2-one, m.p. 102°–104°C. 1-[β-(β'-methoxyethoxy)-ethyl]-5-(o-fluorophenyl)-7-chloro-1,3-dihydro-2H-1,4-benzodiazepin-2-one, m.p. 70°–72°C. 1-[β-(β'-ethoxyethoxy)-ethyl]-5-phenyl-7-chloro-1,3-dihydro-2H-1,4-benzodiazepin-2-one, m.p. 78°–79°C. 1-[β-(β'-ethoxyethoxy)-ethyl]-5-(o-fluorophenyl)-7-chloro-1,3-dihydro-2H-1,4-benzodiazepin-2-one, m.p. 76°–77°C.

EXAMPLE 11

To a solution of 1 g of 2-(β-phenoxyethyl)amino-5-chlorobenzophenone in 30 ml of dry methylene chloride is added 1.2 g of oxazolid-2,5-dione. To the mixture is added 10 ml of ethereal hydrogen chloride under ice-cooling, and the mixture is stirred at room temperature. The reaction mixture is poured into water, basified with aqueous ammonia and extracted with methylene chloride. The extracts are combined, washed with saturated sodium chloride solution, and the solvent is removed. The residue is crystallized and recrystallized from isopropanol-chloroform to give 1-(β-phenoxyethyl)-5-phenyl-7-chloro-1,3-dihydro-2H-1,4-benzodiazepin-2-one, m.p. 165°–166°C.

Similarly, the following compounds are prepared. 1-(β-phenoxyethyl)-5-(o-fluorophenyl)-7-chloro-1,3-dihydro-2H-1,4-benzodiazepin-2-one, m.p. 131°–132°C. 1-(β-benzyloxyethyl)-5-phenyl-7-chloro-1,3-dihydro-2H-1,4-benzodiazepin-2-one, m.p. 133°–135°C. 1-(β-benzyloxyethyl)-5-(o-fluorophenyl)-7-chloro-1,3-dihydro-2H-1,4-benzodiazepin-2-one, m.p. 114°–115.5°C. 1-[β-(β'-methoxyethoxy)-ethyl]-5-phenyl-7-chloro-1,3-dihydro-2H-1,4-benzodiazepin-2-one, m.p. 93°–94°C. 1-[β-(β'-methoxyethoxy)-ethyl]-5-(o-fluorophenyl)-7-chloro-1,3-dihydro-2H-1,4-benzodiazepin-2-one, m.p. 70°–72°C. 1-[β-(β'-ethoxyethoxy)-ethyl]-5-phenyl-7-chloro-1,3-dihydro-2H-1,4-benzodiazepin-2-one, m.p. 78°–79°C. 1-[β-(β'-ethoxyethoxy)-ethyl]-5-(o-fluorophenyl)-7-chloro-1,3-dihydro-2H-1,4-benzodiazepin-2-one, m.p. 76°–77°C.

What is claimed is:

1. A compound of the formula

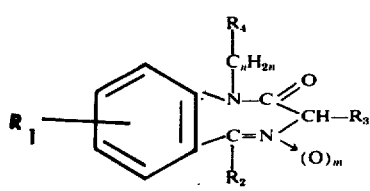

wherein $R_1$ represents hydrogen, halogen, nitro, $C_{1-4}$ alkoxy, cyano or trifluoromethyl;

$R_2$ represents a group of the formula

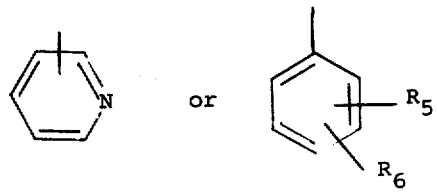

wherein $R_5$ and $R_6$ represent hydrogen, halogen, $C_{1-4}$ alkyl or trifluoromethyl;

$R_3$ represents hydrogen, $C_{1-4}$ alkyl or unsubstituted or halogen- or $C_{1-4}$ alkyl-substituted phenyl-$C_{1-2}$-alkyl;

$R_4$ represents tetrahydropyranyloxy;

$m$ represents zero or 1; and $n$ represents an integer of 1 to 4; and acid addition salts thereof.

2. A compound of the formula

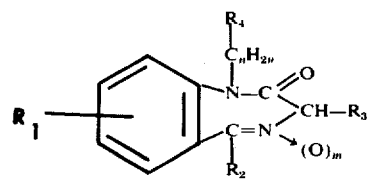

wherein $R_1$ represents hydrogen, halogen, nitro, $C_{1-4}$ alkoxy, cyano or trifluoromethyl;

$R_2$ represents a group of the formula

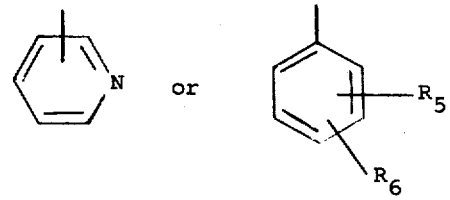

wherein $R_5$ and $R_6$ represent hydrogen, halogen, $C_{1-4}$ alkyl or trifluoromethyl;

$R_3$ represents hydrogen, $C_{1-4}$ alkyl or unsubstituted or halogen- or $C_{1-4}$ alkyl-substituted phenyl-$C_{1-2}$-alkyl;

$R_4$ represents tetrahydrofuranyloxy;

$m$ represents zero or 1; and $n$ represents an integer of 1 to 4; and acid addition salts thereof.

3. A compound of the formula

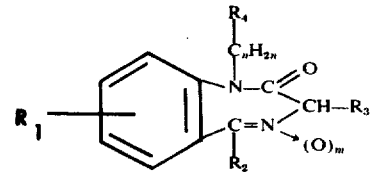

wherein $R_1$ represents hydrogen, halogen, nitro, $C_{1-4}$ alkoxy, cyano or trifluoromethyl;

$R_2$ represents a group of the formula

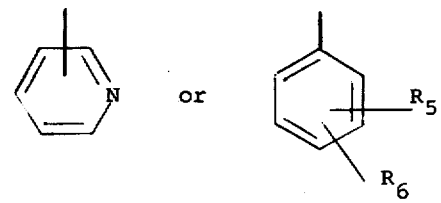

wherein $R_5$ and $R_6$ represent hydrogen, halogen, $C_{1-4}$ alkyl or trifluoromethyl;

$R_3$ represents hydrogen, $C_{1-4}$ alkyl or unsubstituted or halogen- or $C_{1-4}$ alkyl-substituted phenyl-$C_{1-2}$-alkyl;

$R_4$ represents benzyloxy which may be unsubstituted or substituted with halogen or $C_{1-4}$ alkyl or phenethyloxy which may be unsubstituted or substituted with halogen or $C_{1-4}$ alkyl;

$m$ represents zero or 1; and $n$ represents an integer of 1 to 4; and acid addition salts thereof.

4. 1-($\beta$-benzyloxyethyl)-5-phenyl-7-chloro-1,3-dihydro-2H-1,4-benzodiazepin-2-one.

5. 1-($\beta$-benzyloxyethyl)-5-(o-fluorophenyl)-7-chloro-1,2-dihydro-2H-1,4-benzodiazepin-2-one.

6. 1-[$\beta$-($\alpha'$-tetrahydropyranyloxy)-ethyl]-5-phenyl-7-chloro-1,3-dihydro-2H-1,4-benzodiazepin-2-one.

7. 1-[$\beta$-($\alpha'$-tetrahydropyranyloxy)-ethyl]-5-(o-fluorophenyl)-7-chloro-1,3-dihydro-2H-1,4-benzodiazepin-2-one.

8. A process for preparing a compound of the formula,

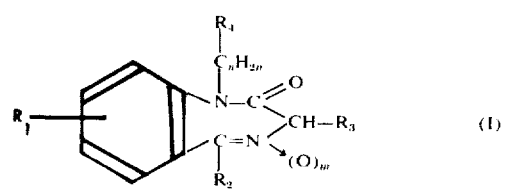

(I)

wherein $R_1$ represents hydrogen, halogen, nitro, $C_{1-4}$ alkoxy, cyano or trifluoromethyl;

$R_2$ represents a group of the formula,

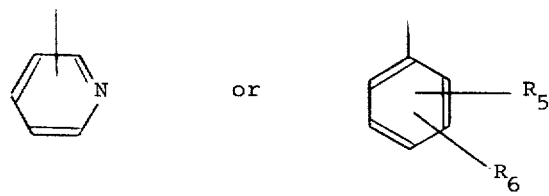

wherein $R_5$ and $R_6$ represent hydrogen, halogen, $C_{1-4}$ alkyl or trifluoromethyl;

$R_3$ represents hydrogen, $C_{1-4}$ alkyl or unsubstituted or halogen- or $C_{1-4}$ alkyl-substituted phenyl-$C_1$-$C_2$ alkyl;

$R_4$ represents tetrahydropyranyloxy, tetrahydrofuranyloxy, unsubstituted phenoxy, halogen-substituted phenoxy or $C_{1-4}$ alkyl-substituted phenoxy, unsubstituted or halogen- or $C_1$-$C_4$ alkyl-substituted phenyl-$C_1$-$C_2$ alkoxy or $C_1$-$C_4$ alkoxy-$C_1$-$C_4$ alkoxy;

$m$ represents zero or 1; and $n$ represents an integer of 1 to 4; and acid addition salts thereof which comprises treating a benzophenone derivative represented by the formula,

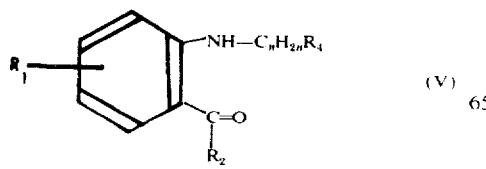

(V)

wherein $R_1$, $R_2$, $R_4$ and $n$ are as defined above, with a compound of the formula,

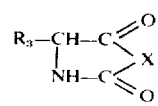

wherein $R_3$ is as defined above and X represents oxygen or sulfur.

9. A process according to claim 8, wherein the reaction is carried out in the presence of an acid.

10. A process according to claim 8, wherein the benzodiazepine derivative represented by the formula,

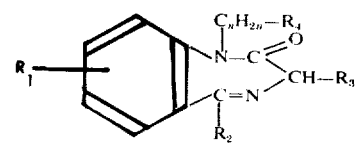

wherein $R_1$ represents hydrogen, halogen, nitro, $C_{1-4}$ alkoxy or trifluoromethyl;

$R_2$ represents pyridyl, phenyl, halogen-substituted phenyl, $C_{1-4}$ alkyl-substituted phenyl, trifluoro-methyl-substituted phenyl or a group of the formula

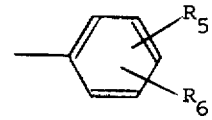

wherein $R_5$ and $R_6$ represent halogen, $C_{1-4}$ alkyl or trifluoromethyl;

$R_3$ represents hydrogen or $C_{1-4}$ alkyl; $R_4$ represents unsubstituted phenoxy, halogen substituted phenoxy or $C_1$-$C_4$ alkyl-substituted phenoxy, unsubstituted or halogen- or $C_{1-4}$ alkyl-substituted phenyl-$C_1$-$C_2$ alkoxy or $C_1$-$C_4$ alkoxy-$C_1$-$C_4$ alkoxy; $n$ represents an integer of 1 to 4, or acid addition salt thereof, is prepared by reacting a benzophenone derivative represented by the formula,

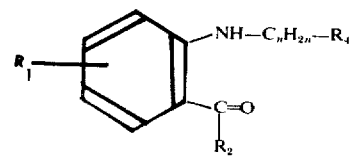

wherein $R_1$, $R_2$, $R_3$ and $n$ are as defined above or an acid addition salt thereof, with a 2,5-oxazolidine derivative represented by the formula

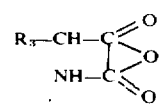

wherein $R_3$ is as defined above.

* * * * *